March 16, 1954  A. N. STANTON  2,672,416
REFLEX PHOTOGRAPHY UTILIZING A LUMINESCENT LIGHT SOURCE
Filed Nov. 16, 1949
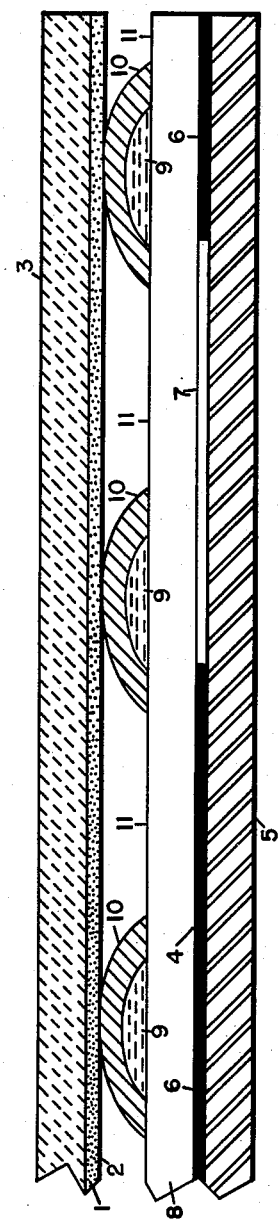
INVENTOR.
Austin N Stanton Patented Mar. 16, 1954

2,672,416

UNITED STATES PATENT OFFICE 2,672,416

REFLEX PHOTOGRAPHY UTILIZING A LUMINESCENT LIGHT SOURCE

Austin N. Stanton, Garland, Tex.

Application November 16, 1949, Serial No. 127,553

5 Claims. (Cl. 95—5)

This invention relates to the reproduction of originals, such as drawings, written and printed matter, and other graphic material, and more particularly to a means and process for photographic reproduction of originals.

This application is directed to the invention disclosed in my abandoned application, Serial Number 565,943, filed November 30, 1944.

Originals, such as drawings, written and printed matter, and graphic material which are opaque or only slightly transparent to light, or originals carrying graphic material on both sides can be reproduced only by using light rays reflected by the original. Originals which are transparent to light may be reproduced by projecting light rays through the original to a photosensitive surface. The latter method involves the use of considerable apparatus, for example, a light projecting means and a lens to focus the light on the photosensitized surface. In accordance with the teachings of my invention, I provide a new and improved means for reproducing both opaque and transparent originals without the necessity of employing extensive apparatus.

It is an object of my invention to provide a new and improved means for reproducing originals.

It is another object of my invention to provide a new and improved process for reproducing originals.

It is another object of my invention to provide a new and improved means for reproducing originals by interposing a luminescent or phosphorescent source of light between a photosensitive surface and the original to be copied.

It is still another object of my invention to provide a new and improved process for reproducing originals by interposing a luminescent or phosphorescent source of light between a photosensitive surface and the original to be copied.

Briefly stated, in the illustrated embodiment of my invention I provide a photosensitized surface upon which the original is to be reproduced, and a source of light to be interposed between the photosensitive surface and the original so that light rays reflected by the original will strike the photosensitive surface. The source of light comprises a sheet of transparent material having upon one surface a large number of spaced particles of luminescent or phosphorescent material.

The luminescent material will emit light only after it itself has been exposed to light while the phosphorescent material will emit light without previous excitation by exposure to light. Each of the luminescent or phosphorescent particles has an opaque covering or shell surrounding it at all points except where it contacts the transparent sheet. The luminescent or phosphorescent particles therefore project their light in a common direction through the transparent sheet and in a direction perpendicular to the surface of the sheet. The transparent sheet is placed upon the original so that the light from the particles is radiated upon the original. The photosensitive surface is placed over the transparent sheet and the original with the opaque covers adjacent the photosensitive surface. The opaque covers prevent any light from being radiated directly from the particles to the photosensitive surface. Only light reflected by the original will reach the photosensitive surface thereby reproducing the original on the surface.

The photosensitive surface may form a reproduction directly from the original. In this case the reproduction will be a negative of the original, i. e., lights and shadows will be reversed as compared with the original. The negative may, of course, be employed to produce a positive reproduction, i. e., a reproduction in which the lights and shadows correspond to those of the original.

For a better understanding of my invention, reference may be had to the following description taken in connection with the accompanying drawing, and its scope will be pointed out in the accompanying claims. The single figure of the accompanying drawing is a sectional diagram of a preferred embodiment of the means by which the reproduction may be made.

Referring now to the single figure of the drawing, a light sensitive or photosensitive layer 1 forms a photosensitive surface 2 on a backing sheet 3. The photosensitive layer 1 may be of any suitable photosensitive material and the backing sheet 3 may be of paper, glass, metal, film or any other desired substance. If glass is employed, the surface opposite the photosensitive layer must be rendered opaque by coating it with an opaque substance, adding an opaque backing sheet, or in any other suitable manner.

The original 4 which is to be reproduced is on a base 5 which can be of any material whatsoever. The original 4 comprises dark areas 6 and light areas 7 which absorb and reflect light, respectively.

Interposed between the original 4 and the photosensitive surface 2 is a sheet 8 of transparent material. On one side of sheet 8 are spaced particles or deposits 9 of light emissive substance. The deposits 9 are of relatively very small size and the light emissive substance may be any suitable luminescent or phosphorescent material. The deposits 9 may be placed on sheet 8 in any suitable way, e. g., by printing. About each deposit 9 is an opaque covering 10, which may also be deposited or placed by printing. Each opaque covering 10 encloses its corresponding deposit 9 except where the deposit 9 contacts sheet 8. The light emitted by deposits 9 is projected in a common single direction through sheet 8 since the opaque coverings 10 prevent the light from traveling in any other direction. The opaque coverings 10 are adjacent the photosensitive surface 2 and prevent the light emitted by deposits 9 from traveling directly to the photosensitive surface 2. Transparent sheet 8 is disposed so that the surface having deposits 9 is adjacent photosensitive surface 2 while the opposite surface of transparent sheet 8 is in contact with original 4. The light emitted by deposits 9 is projected only to original 4 due to the shielding action of opaque coverings 10. The light which falls on light areas 7 of original 4 is largely reflected upwardly and reaches photosensitive surface 2 by passing through the clear spaces 11 between the opaque areas formed by deposits 9 and opaque coverings 10. The light which falls upon dark areas 6 of original 4, however, is largely absorbed by the dark areas 6 and the portion of photosensitive surface 2 which lies above such dark areas 6 receives little or no light. Since the deposits 9 are very small and the thickness of transparent sheet 8 is also very small, very little spreading of the emitted and reflected light rays will occur before they strike photosensitive surface 2. The image projected on photosensitive surface 2 will therefore be a faithful reproduction of original 4.

The process of reproducing an original 4, such as a page of printed material, is obviously very simple. The transparent sheet 8 is placed on original 4 so that the surface of sheet 8 which has deposits 9 is further from the original than the untreated surface.

The photosensitive layer 1 and its backing sheet 3 are superposed on transparent sheet 8 and the transparent sheet 8 and photosensitive layer 1 are pressed firmly to original 4 for a period of time sufficient to properly expose photosensitive surface 2. The photosensitive layer 1 and its backing sheet 3 are then removed and photosensitive layer 1 is developed. After development, photosensitive layer 1 will be a negative of original 4. A positive reproduction of original 4 can be made from the developed layer 1 by conventional means well known to those skilled in the art.

It is possible to attach transparent sheet 8 to photosensitive layer 2 and backing sheet 3 by any suitable means, such as a transparent adhesive, so that they may be placed simultaneously in desired position on original 4. The adhesive must be of a type which permits easy separation of transparent sheet 8 from photosensitive layer 1. The transparent sheet 8 and the photosensitive layer 1 and backing sheet 3 after being secured to each other may be kept in a black envelope. The black surface of the envelope will absorb all light emitted by the deposits 9 and the photosensitive layer will not be subjected to light until the transparent sheet 8 and the photosensitive layer 2 are removed from the black envelope and positioned on the original which is to be reproduced.

Transparent sheet 8 and its deposits 9 can be used many times. If the light emissive substance of deposits 9 is luminescent in nature, it may be activated prior to each use by exposing it to light for a short period of time. If the light emissive substance is phosphorescent in nature, no activation is necessary. In some applications, it is desirable to employ the developed photosensitive layer as a template. The exact dimensions of the original must be reproduced but the ordinary developing process which involves immersion of the film in a liquid developing agent causes some distortion of the film in the moistening and drying processes. In order to avoid all possible errors in reproduction of the original, I glue the exposed sensitive layer 1 and its backing sheet 3 to the stock which is to be made into a facsimile of the original. The glue is moist and contains dissolved in it the developing agent to develop the photosensitive layer 1. Since only the photosensitive layer 1 is moistened and the backing sheet 3 is kept substantially dry, no distortion of the backing sheet 3 will occur. The developed image of the original is therefore exactly reproduced and is fixed to the stock. The opaque covering on the outside surface of backing sheet 3 is made removable by some conventional means, such as loosely adherent glue. Upon removal of the opaque covering, the image of the original can be easily seen and is readily usable in the same manner as a template.

If the photosensitive layer 1 is sufficiently insensitive or slow reacting, the opaque covering on the backing sheet 3 need not be employed, the developing agent then developing the image before any blurring due to exposure of the photosensitive layer to light can occur. The developing process can also be carried out in comparative darkness, this obviating the use of an opaque cover for backing sheet 3.

While I have shown and described preferred embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. The process of reproducing an original comprising activating a plurality of spaced luminescent particles, which are shielded to permit projection of light emitted by the particles in only one common direction, by exposure thereof to light, placing said plurality of spaced luminescent particles in spaced relation to said original and illuminating said original by the light emitted by said luminescent particles, the spaces between said particles permitting passage of light in any direction, placing a photosensitive layer adjacent said luminescent particles with the luminescent particles interposed between said photosensitive layer and said original to imprint an image of said original on said photosensitive layer by means of the light which is emitted by said luminescent particles and which is reflected by said original, and removing and developing said photosensitive layer after exposure.

2. The process of reproducing an original comprising placing a plurality of spaced light emitting particles, which are shielded to permit projection of light emitted by the particles in only one common direction, in spaced relation with said original, the spaces between said particles permitting passage of light in any direction, and illuminating said original by the light emitted by said particles, placing a photosensitive layer adjacent said particles with the particles interposed between said photosensitive layer and said original to imprint an image of said original on said photosensitive layer by means of the light which is emitted by said particles and which is reflected by said original, and removing and developing said photosensitive layer after exposure.

3. The process of reproducing an original comprising placing a plurality of spaced light emitting particles which are shielded to permit projection of light emitted by said particles in only one common direction in spaced relationship with said original, the spaces between said particles permitting passage of light in any direction, and illuminating said original by the light emitted by said particles, placing a photosensitive layer adjacent said particles with the particles interposed between said photosensitive layer and said original to imprint an image of said original on said photosensitive layer by means of the light which is emitted by said particles and which is reflected by said original, removing said photosensitive layer after exposure, and attaching it to a piece of stock by means of a water containing glue, said glue having dissolved in it a developing agent for developing said photosensitive layer, said glue contacting said photosensitive layer.

4. The process of reproducing an original comprising activating a plurality of spaced luminescent particles which are shielded to permit light emitted by said particles to be projected in only one common direction by exposure thereof to light, the spaces between said particles permitting passage of light in any direction, placing said plurality of spaced luminescent particles in spaced relation to said original and illuminating said original by the light emitted by said luminescent particles, placing a photosensitive layer adjacent said luminescent particles with the luminescent particles interposed between said photosensitive layer and said original to imprint an image on said photosensitive layer by means of the light which is emitted by said luminescent particles and which is reflected by said original, removing said photosensitive layer and attaching it to a piece of stock by means of glue, said glue having dissolved in it a developing agent for developing said photosensitive layer, said glue contacting said photosensitive layer.

5. The process of reproducing an original comprising placing a plurality of spaced phosphorescent particles, which are shielded to permit projection of light emitted by the particles in only one common direction, in spaced relation with said original, the spaces between said particles permitting passage of light in any direction, and illuminating said original by the light emitted by said particles, placing a photosensitive layer adjacent said particles with the particles interposed between said photosensitive layer and said original to imprint an image of said original on said photosensitive layer by means of the light which is emitted by said particles and which is reflected by said original, and removing and developing said photosensitive layer after exposure.

AUSTIN N. STANTON.

References Cited in the file of this patent

UNITED STATES PATENTS

| Number | Name | Date |
|---|---|---|
| 1,565,256 | Christensen | Dec. 15, 1925 |
| 1,910,573 | Tal | May 23, 1933 |
| 2,417,384 | Switzer | Mar. 11, 1947 |
| 2,441,010 | Dobbins | May 4, 1948 |

OTHER REFERENCES

Clerc: "Ilford Manual of Process Work," Ilford, Ltd., London 1946, 4th ed., page 244.